(No Model.)

L. P. THOMAS.
BEAN PULLER.

No. 431,127.  Patented July 1, 1890.

WITNESSES:

INVENTOR
Lyndsey P. Thomas
BY
his ATTORNEY.

UNITED STATES PATENT OFFICE.

LYNDSEY P. THOMAS, OF CANNON, MICHIGAN.

BEAN-PULLER.

SPECIFICATION forming part of Letters Patent No. 431,127, dated July 1, 1890.

Application filed October 5, 1889. Serial No. 326,155. (No model.)

*To all whom it may concern:*

Be it known that I, LYNDSEY P. THOMAS, a citizen of the United States, residing at township of Cannon, in the county of Kent and State of Michigan, have invented certain new and useful Improvements in Bean-Pullers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1:
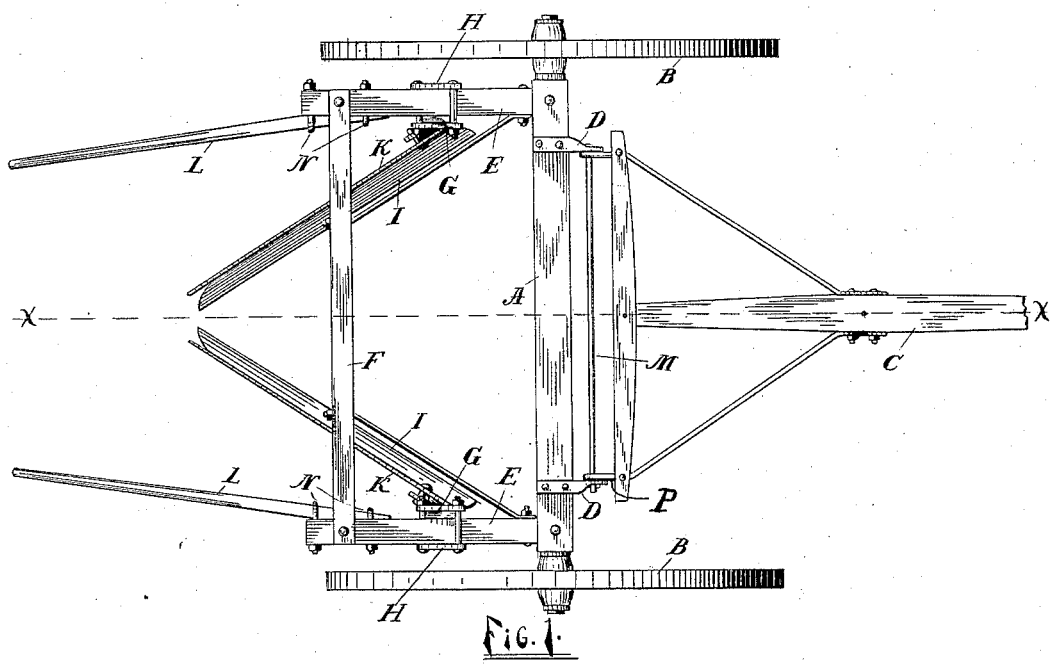
Figure 2:
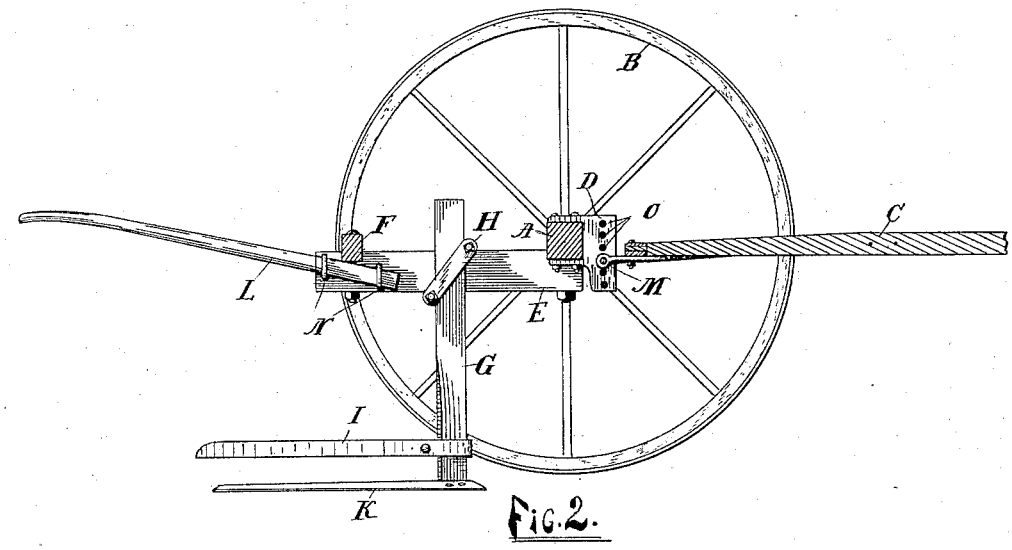

Figure 1 is a plan view of my invention. Fig. 2 is a sectional view on the line $x\ x$ of Fig. 1.

Similar letters refer to similar parts.

My invention has for its object the harvesting or pulling of bean-vines by means of a machine operated by horse or other power and carrying knives running slightly below the surface of the ground, obliquely to the axle and slanting inward.

I describe my invention as follows:

A is the axle, B B the supporting-wheels, C the tongue, and D D the clevises.

The knife-holding frame is composed of the side bars E E, the cross-bar F, properly braced to the side bars to give strength and stiffness.

G G are standards attached to side bars by adjustable clamps H H, and carrying the guides I I and shortly below said guides the knives K K. Said guides and knives are firmly attached to the standards parallel to the plane of the knife-holding frame and turned obliquely inward, as shown in Fig. 1.

L L are the handles, and N the fastenings by which handles are attached to side bars.

Secured to the axle are the clevises D D, pierced with a vertically-extending series of holes O O. By means of these holes and the bar M, by which the pole or tongue of machine is attached, the tongue C can be carried high or low, and thereby the pitch of the knives regulated according to the nature and condition of the soil.

It is intended that the machine shall be wide enough to take in two rows of beans at a time, the knives running just below the surface, cutting the roots, and the guides I I gathering the vines and leaving them in a row in the center of the pathway. The side bars E E might be attached to axle by means of hinges; but this is not thought by me as desirable as to have them permanently fastened thereto, as herein described. It will be seen that the person holding the handles L L is able to control, to a great extent, the position of the knives by lifting or depressing the handles or by a slightly jerking motion to assist in freeing the roots of the vines from the soil. It will also be seen that the movable clamps by which the standards are held to the side bars permit same to be placed at different distances from the axle, thus enabling the regulation of the pitch of the knives to suit the quality of the soil, whether running deep or shallow, as may be desirable.

I am aware of other bean-pullers having knives similar in shape and general position; but

What I claim as original, and for which I desire Letters Patent of the United States, is—

1. In a bean-harvester, the combination of a frame secured to the axle, standards G, each carrying a knife and a guide, means, substantially as described, for securing the standards to the frame, whereby the same are adjustable vertically and also forwardly and backwardly, substantially as shown.

2. In a bean-harvester, the combination of a frame secured to the axle, standards G, each carrying a knife and a guide, means, substantially as described, for securing the standards to the frame, whereby the same are adjustable vertically as well as forwardly and backwardly, the clevises D, and tongue C, with means, substantially as described, whereby the said tongue may be secured at different points vertically upon said clevises, for the purpose set forth.

In testimony whereof I affix my signature in presence of two witnesses.

LYNDSEY P. THOMAS.

Witnesses:
ADOLPH B. MASON,
GALE R. MASON.